United States Patent
Bisset et al.

(10) Patent No.: US 9,587,664 B2
(45) Date of Patent: Mar. 7, 2017

(54) LIGHT LOAD COMPRESSION LIMITING FASTENING SYSTEM

(71) Applicant: ILLINOIS TOOL WORKS INC., Glenview, IL (US)

(72) Inventors: John D. Bisset, Hudsonville, MI (US); Jason D. Holt, Lexington, KY (US); Ronald C. Owens, II, Lexington, KY (US); Daniel A. Dechant, Woodstock, IL (US)

(73) Assignee: Illinois Tool Works Inc., Glenview, IL (US)

( * ) Notice: Subject to any disclaimer, the term of this patent is extended or adjusted under 35 U.S.C. 154(b) by 115 days.

(21) Appl. No.: 14/386,345

(22) PCT Filed: Mar. 19, 2013

(86) PCT No.: PCT/US2013/032891
§ 371 (c)(1),
(2) Date: Sep. 19, 2014

(87) PCT Pub. No.: WO2013/142454
PCT Pub. Date: Sep. 26, 2013

(65) Prior Publication Data
US 2015/0086290 A1    Mar. 26, 2015

Related U.S. Application Data (60) Provisional application No. 61/613,147, filed on Mar. 20, 2012.

(51) Int. Cl.
*F16B 5/00* (2006.01)
*F16B 29/00* (2006.01)
(Continued)

(52) U.S. Cl.
CPC ............ *F16B 29/00* (2013.01); *F16B 5/00* (2013.01); *F16B 5/0266* (2013.01); *F16B 39/26* (2013.01); *F16B 41/002* (2013.01); *F16B 43/00* (2013.01)

(58) Field of Classification Search
CPC ..... F16B 5/0233; F16B 5/0283; F16B 5/0241; F16B 43/00; F16B 41/002
(Continued)

(56) References Cited

U.S. PATENT DOCUMENTS 1,801,999 A    4/1931   Bowman
3,687,184 A *   8/1972   Wagner .................. F16B 43/00
                                                  411/135
(Continued)

FOREIGN PATENT DOCUMENTS

DE           10254999 A1    11/2003
DE      102006059232 B3    6/2008

OTHER PUBLICATIONS

ISR and WO for PCT/US2013/032891 mailed Jul. 4, 2013.

*Primary Examiner* — Flemming Saether (57) ABSTRACT

A compression limiting fastening system incorporating a spring element and cooperating compression limiting sleeve adapted for substantially coaxial receipt of a fastening element through a fastened component so as to apply a relatively light load to an outer surface of the fastened component during the fastening operation. Once fastened down, the compression limiting sleeve supports the fastening load while the spring element applies a relatively light opposing load to the fastened component.

13 Claims, 5 Drawing Sheets

(51) Int. Cl.
*F16B 43/00* (2006.01)
*F16B 41/00* (2006.01)
*F16B 5/02* (2006.01)
*F16B 39/26* (2006.01)

(58) Field of Classification Search
USPC .................................................. 411/546, 999
See application file for complete search history.

(56) References Cited

U.S. PATENT DOCUMENTS

| | | | | |
|---|---|---|---|---|
| 4,193,434 A | * | 3/1980 | Wagner | F16B 43/00 411/154 |
| 4,396,327 A | * | 8/1983 | Menke | F16B 5/02 29/434 |
| 4,435,112 A | | 3/1984 | Becker | |
| 4,863,329 A | * | 9/1989 | Wilson | F16B 5/02 248/635 |
| 6,523,817 B1 | * | 2/2003 | Landry, Jr. | F16F 15/08 267/141.2 |
| 6,910,671 B1 | * | 6/2005 | Norkus | F16F 1/3735 248/560 |
| 7,198,445 B2 | | 4/2007 | Kramer | |
| 7,785,054 B2 | * | 8/2010 | Parisi | B60R 11/00 296/35.1 |
| 2002/0098058 A1 | * | 7/2002 | Caldera | F16B 19/02 411/353 |
| 2004/0154242 A1 | * | 8/2004 | Hudoba | E06B 9/02 52/202 |
| 2005/0260061 A1 | * | 11/2005 | Sung | F16B 43/00 411/533 |
| 2008/0075403 A1 | | 3/2008 | Holt et al. | |

* cited by examiner

LIGHT LOAD COMPRESSION LIMITING FASTENING SYSTEM

CROSS-REFERENCE TO RELATED APPLICATIONS

This application is a National Phase of International Application Number PCT/US2013/032891 filed Mar. 19, 2013 and claims the benefit of, and priority from, U.S. provisional application 61/613,147 filed Mar. 20, 2012. The contents of such priority application are hereby incorporated by reference in their entirety as if fully set forth herein.

FIELD OF THE DISCLOSURE

The present disclosure relates generally to connection assemblies, and more specifically to a fastening system for receipt of an elongated male fastening element through a fastened component so as to apply a relatively light load to the fastened component while the fastening element establishes a secure connection with an underlying mating structure. By way of example only, connection assemblies in accordance with the present disclosure may find application in the connection of relatively delicate trim elements or the like to underlying support structures during automotive assembly and similar environments of use.

BACKGROUND

It is known to connect a threaded member in place relative to the surface of a panel or other component (referred to herein as the "fastened component") by extending an elongated male fastening element such as a threaded bolt or the like through a hole in the fastened component and engaging a mating structure at the far side of the fastened component. By way of example only, the mating structure may be a rotatable nut or a component such as a panel or the like with a female opening for receipt and engagement with the fastening element. By tightening down the fastening element, the fastened component and the underlying mating structure are drawn together so as to be held in a secure relation to one another. While such an arrangement provides a secure connection, the fastened component may experience a substantial level of compression as pressure is applied by the fastening element. In severe situations, such compression may cause structural or cosmetic damage to the fastened component.

It is known to use supporting sleeve inserts to act as compression limiters at the interior of the opening in the fastened component. Such sleeve inserts may be useful in preventing over compression of the fastened component. A sleeve insert also may be used to maintain a gap between the fastened component and the underlying mating structure. While sleeve inserts may provide a useful function, such elements do not provide any stabilizing load across the upper surface of the fastened component during connection. An independent cylindrical sleeve also typically requires a separate installation step at the time of connection. An improved compression limiting connection assembly which provides a stabilizing load across the upper surface of the fastened component while avoiding surface damage due to over-tightening would thus provide a desirable improvement over the current art.

SUMMARY OF THE DISCLOSURE

The fastening system of the present disclosure permits a fastening element such as a bolt or the like to be fastened down fully while still maintaining a relatively light load on a fastened component. This avoids over compression which may lead to damage or fatigue over time when using delicate materials.

The present disclosure provides advantages and alternatives over the prior art by providing a compression limiting fastening system incorporating a spring element and cooperating compression limiting sleeve (i.e. bushing) adapted for substantially coaxial receipt of a fastening element through a fastened component so as to apply a relatively light load to an outer surface of the fastened component during the fastening operation. Once fastened down, the compression limiting sleeve supports the fastening element load while the spring element applies a relatively light opposing load to the fastened component. If desired, the compression limiting sleeve may be configured to maintain a space between the fastened component and an underlying mating structure. However, the compression limiting sleeve may likewise be configured to provide a substantially face to face connection between the fastened component and the mating structure if desired.

In accordance with one exemplary aspect, the present disclosure provides a fastening system adapted to secure a fastened component in overlying relation to an underlying mating structure. The fastening system includes an elongated fastener having a head and a shaft extending away from the head. The fastening system further includes an annular sleeve with an axial hub and an annular flange extending radially outwardly from the axial hub to an outer flange edge. The flange edge is disposed at an elevation below an upper proximal edge of the axial hub. The axial hub includes a hollow central passageway adapted to matedly receive the shaft of the fastener in pass-through relation such that a portion of the fastener remote from the head extends beyond central passageway. A resilient spring is adapted to matedly surround a portion of the shaft below the head and above the annular sleeve. The spring includes a central opening with a biasing element extending downwardly and radially outwardly away from the central opening to an outer edge of the spring disposed at an elevation below the central opening and below the upper proximal edge of the axial hub when the fastening system is in an assembled condition.

Other features and advantages of the disclosure will become apparent to those of skill in the art upon review of the following detailed description, claims and drawings.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 1:
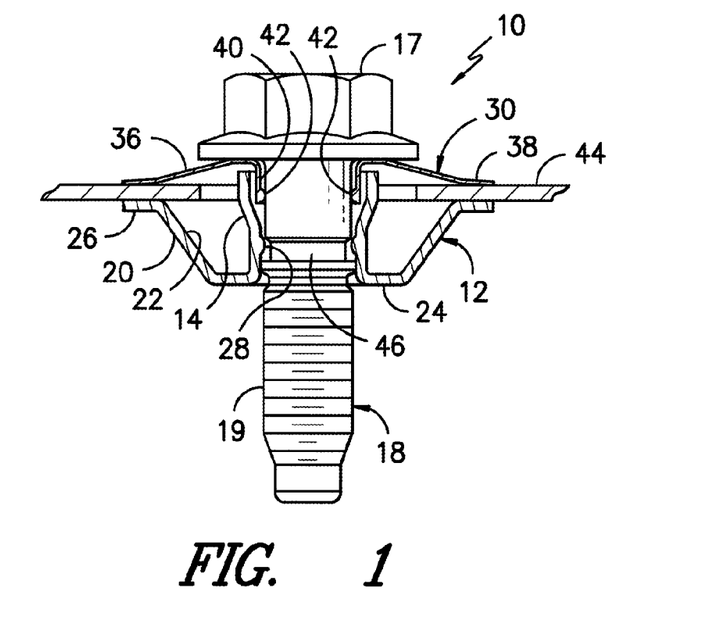
FIG. 1 is a schematic sectional view of an exemplary fastening system in accordance with one embodiment of the present disclosure prior to engaging a mating structure.
Figure 2:
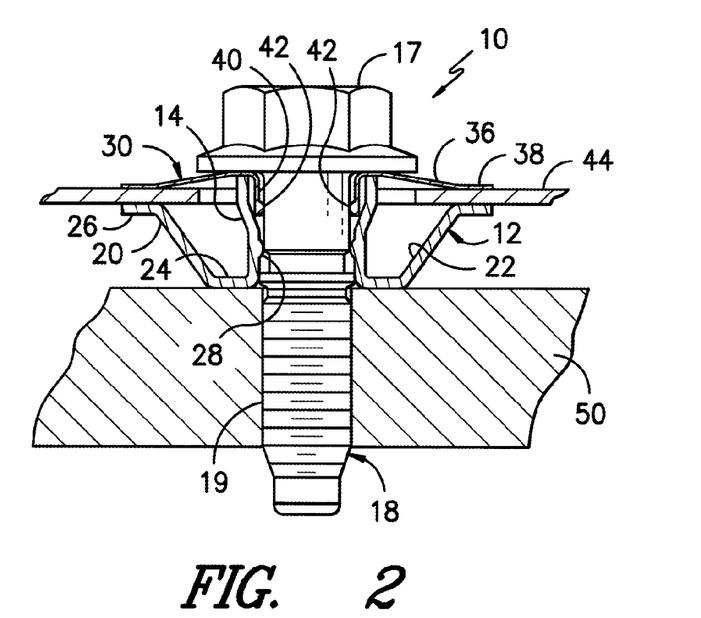
FIG. 2 is a schematic view similar to FIG. 1 with the fastening system engaging an underlying mating structure.
Figure 3:
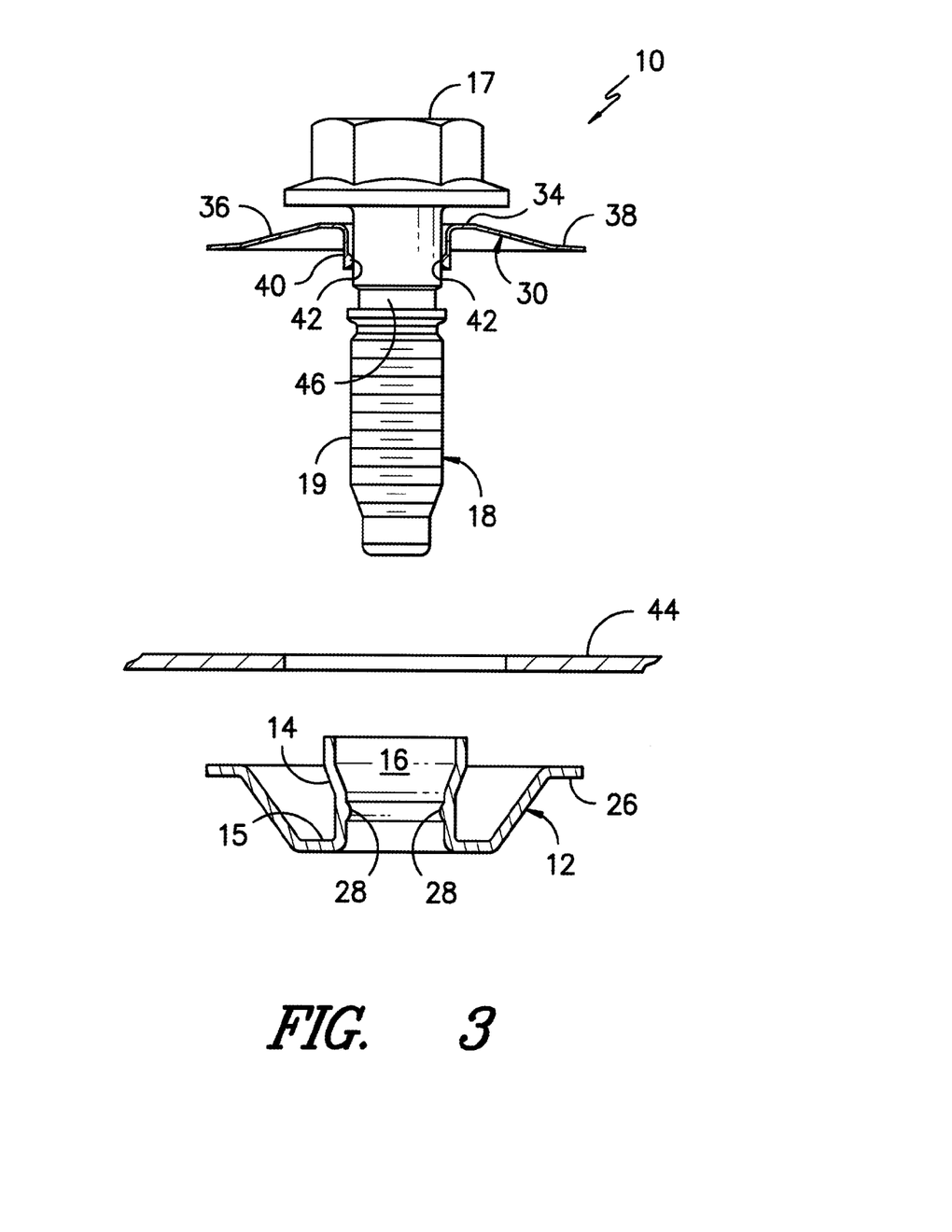
FIG. 3 is an exploded schematic sectional view illustrating the components in FIG. 1 prior to assembly.

Reference will now be made to the drawings, wherein to the extent possible, like elements are designated by like reference numerals in the various views. Referring now jointly to FIGS. 1-3, an exemplary fastening system 10 is illustrated. As shown, in the exemplary construction the fastening system 10 includes a compression limiting sleeve 12 (i.e. bushing) of drawn metal or the like. By way of example only, the sleeve 12 may be formed from spring steel or the like, although other metals or polymers may be used if desired.

Figure 4:
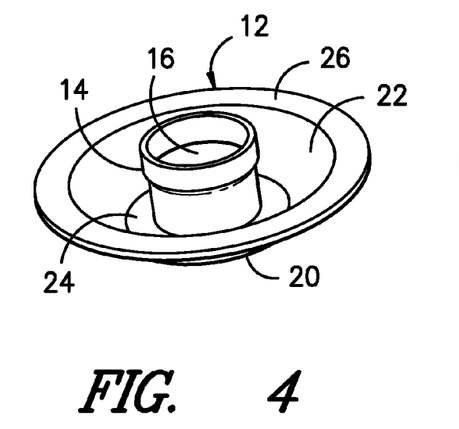
FIG. 4 is a schematic perspective view illustrating an exemplary compression-limiting sleeve.

As best seen through joint reference to FIGS. 1 and 4, the sleeve 12 may have a substantially annular bowl shape defining a torus surrounding an axial hub 14. The axial hub 14 includes a central axial passageway 16 for receipt of a bolt 18. As shown, the bolt 18 may include a tool-engaging head 17 of polymeric geometry with a threaded shaft 19 extending downwardly from the head. In this regard, it is to be understood that the term "bolt" is meant to include any elongated male fastening element as may be known to those of skill in the art.

As best seen in FIG. 4, in the illustrated exemplary construction, the sleeve 12 includes an annular sleeve flange 20 having a concave interior with a sloped wall 22 extending radially away from a substantially flat base 24 which surrounds a distal end of the hub 14. In the illustrated exemplary construction, the sloped wall 22 terminates at a substantially flat lip 26 disposed at an elevation above the base 24.

As seen through joint reference to FIGS. 3 and 4, the hub 14 may be in the form of a variable diameter cylinder having an enhanced diameter in an upper proximal section and a reduced diameter in a lower distal section. A detent structure 28 in the form of a continuous or discontinuous ring, a series of individual raised profile elements or other structures may be disposed circumferentially about the interior of the hub at a fixed height along the length of the cylinder to define a minimum effective inner diameter for the hub 14 at an intermediate position along the length. As will be described further hereinafter, the detent structure 28 may be used to hold the sleeve 12 about the shaft 19 of the bolt 18 prior to use.

Figure 5:
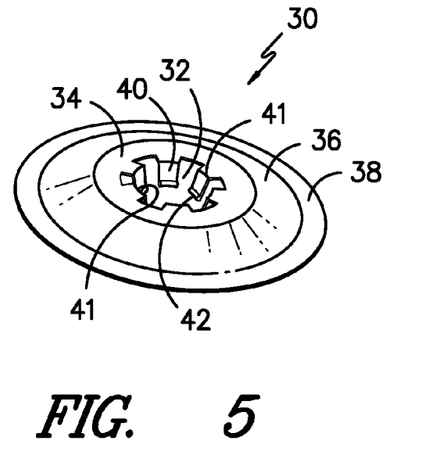
FIG. 5 is a schematic perspective view illustrating an exemplary disc spring.

As best seen through joint reference to FIGS. 1, 3 and 5, the exemplary fastening system 10 further includes a spring element 30 such as an annular disc spring of light weight stamped spring steel or the like. In the illustrated exemplary construction of FIGS. 1-6, the spring element 30 may have a generally dome-shaped construction adapted for disposition in surrounding relation to an upper segment of the shaft 19 in generally coaxial relation to the sleeve 12. As best seen in FIG. 5, the exemplary spring element 30 includes a central opening 32 with an irregular perimeter adapted to grip an upper segment of the shaft 19. In the exemplary construction a substantially flat annular spring base 34 surrounds the central opening 32 with a sloped annular wall 36 defining a biasing element extending downwardly away from the annular spring base 34 to a substantially flat annular spring lip 38.

In the illustrated exemplary construction, an arrangement of downwardly extending clamping fingers 40 may be disposed about the perimeter of the central opening 32 in the disc spring. In this regard, the clamping fingers 40 may extend downwardly from radially inwardly projecting tabs 41 spaced around the perimeter of the central opening 32 (FIG. 5). Thus, the clamping fingers 40 may each flex independently to press against an upper segment of the shaft 19 below the head. As shown, the fingers 40 may be arranged in a circumferential pattern having a diameter corresponding substantially to the outer diameter of the shaft at an elevation below the head and less than the inner diameter of an upper proximal section of the central passageway 16 in the axial hub 14. As best seen in FIGS. 1 and 3, at least some of the clamping fingers 40 may incorporate radially inwardly projecting knuckles 42 at their terminal ends. As will be appreciated, such inwardly projecting knuckles 42 may press against the surface of the shaft 19 and may act to increase the biasing force between the clamping fingers 40 and the bolt 18.

Referring now to FIGS. 1, 2 and 3, it may be seen that the exemplary fastening system 10 may be preassembled for shipment prior to use. In this regard, the axial hub 14 of the sleeve 12 may be pressed into an access opening in a fastened component 44 from the underside of that component. The bolt 18 with the spring element 30 already in place below the head may then be pressed into the axial passageway 16 from the opposing direction.

In the illustrated exemplary construction, as the shaft 19 of the bolt is pressed into the axial passageway 16, the detent structure 28 may advance along the length of the shaft 19 until reaching a reduced diameter neck 46 above the threads. In this position (FIG. 1) the sleeve 12 is supported loosely about the bolt 18. In the absence of applied axial force, the detent structure 28 is held between shoulders above and below the neck 46 and the sleeve 12 remains in a substantially fixed axial position relative to the shaft 19. The fastened component is thereby held in place between the annular sleeve flange 20 and the spring element 30.

Figure 6:
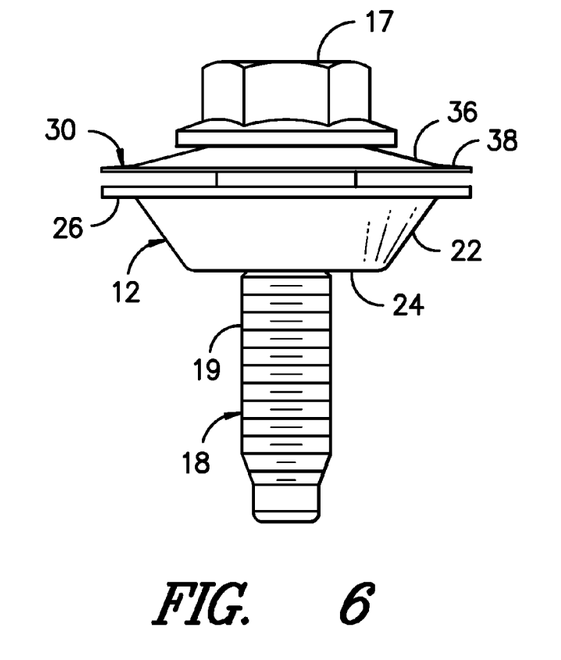
FIG. 6 is a schematic side view illustrating the exemplary compression-limiting sleeve of FIG. 4 and exemplary disc spring of FIG. 5 engaging a bolt.

As shown in FIG. 6, the sleeve 12 and spring element 30 may likewise be pre-assembled about a bolt 18 for shipment without a fastened component in place. As will be appreciated, the arrangement of FIG. 6 may be reversed by applying sufficient axial force to the bolt 18 to move the detent structure 28 out of engagement with the neck 46. Thus, the structure of FIG. 6 may be disassembled at the point of final assembly and then reassembled with a fastened component in place.

Referring again to FIGS. 1 and 2, during use with the fastened component 44 in place, the spring element 30 is arranged about the shaft 19 such that the clamping fingers 40 project downwardly between the walls of the axial hub 14 and the shaft 19. As best seen in FIG. 1, in the assembled condition the annular spring base 34 of the spring element 30 may rest against the underside of the bolt head 17 and the spring lip 38 will rest on top of the fastened component 44 at an elevation below an upper edge of the axial hub 14. In the absence of applied pressure, the spring action of the annular wall 36 will act to maintain a slight gap between underside of the spring element 30 and the upper edge of the axial hub 14 extending above the surface of the fastened component 44. However, as pressure is applied downwardly by the bolt head 17 during tightening, the spring element 30 may be compressed towards the upper edge of the axial hub 14. In practice, this arrangement causes a relatively light pressure to be applied against the upper surface of the fastened component 44 as the bolt 18 is tightened. In this regard, the pressure is applied through the annular wall 36 to the annular spring lip 38 which rests on the upper surface of the fastened component 44. However, any possible over compression is prevented by the blocking action provided by the axial hub 14 extending above the surface of the fastened component 44.

According to one exemplary practice, after assembly of the fastening system 10 with the fastened component 44 in place, the bolt 18 may be inserted into an acceptance opening in a mating structure 50 such as a rotatable nut, or a support component such as a backing panel or the like with a female opening adapted for engagement with the bolt 18. As the bolt is tightened down, the gap between the spring element 30 and the upper edge of the axial hub 14 is progressively closed until further advancement is blocked by the axial hub 14. In the final condition shown in FIG. 2, the sleeve 12 supports the bolt load, while the spring element 30 applies a relatively small load across the upper surface of the fastened component 44. The fastened component 44 is thereby secured in place by a clamping force between the annular sleeve flange 20 and the spring element 30. In this regard, the fastened component 44 is subjected to the spring load applied by the annular sleeve flange 20 and the spring element 30. However, the clamping load applied by the bolt is carried by the axial hub 14. Of course, the amount of load carried by the fastened component 44 may be adjusted by adjusting the strength of the spring element 30 and the contact area between the fastened component 44 and the spring element 30. By way of example only, thicker or more rigid spring element 30 will provide greater load than a thinner element. By way of example only, and not limitation, the fastened component 44 may be a plastic component or other structure susceptible to damage upon the application of excess pressure. According to one exemplary practice the fastened component 44 may be a heat shield and the mating structure 50 may be a heat generating automotive engine component such as a manifold, an engine block or the like. Of course, other fastened component structures may likewise be used.

As will be appreciated, in the illustrated exemplary construction, the sleeve 12 extends to a position substantially below the fastened component 44. Accordingly, a space may be maintained between the fastened component 44 and the mating structure 50. The space between the fastened component 44 and the mating structure 50 may be reduced or eliminated entirely by reducing the depth of the trough between the axial hub 14 and the sloped wall 22 of the annular sleeve flange 20. That is, by flattening the angle between the axial hub 14 and the sloped wall 22, the spacing between the fastened component 44 and the mating structure 50 may be reduced to any degree desired. As will be appreciated, by adjusting the depth of the axial hub below the fastened component, a controlled gap may be established and maintained between the fastened component 44 and the mating structure 50 which is substantially independent of the loading on the fastened component 44.

Regardless of the spacing between the fastened component 22 and the mating structure 40, the present disclosure provides a number of advantages. In particular, the present disclosure maintains the necessary clamp load of the bolt while only distributing a small portion of that load to a delicate fastened component. Moreover, both the sleeve 12 and the spring element 30 may be configured to fit compressively about the bolt 18. Thus, the fastening system 10 may be pre-assembled and will not fall apart prior to engagement with the mating structure 40.

In addition to ease of assembly and reduced stress on the fastened component 44, a fastening system incorporating a biasing spring element 30 such as a disc spring or the like may provide a substantially consistent load to the fastened component 44 over a wide range of temperatures and tolerance conditions. The relatively light spring element 30 will adapt to changes in condition and the ultimate load on the fastened component 44 will not vary significantly.

Figure 7:
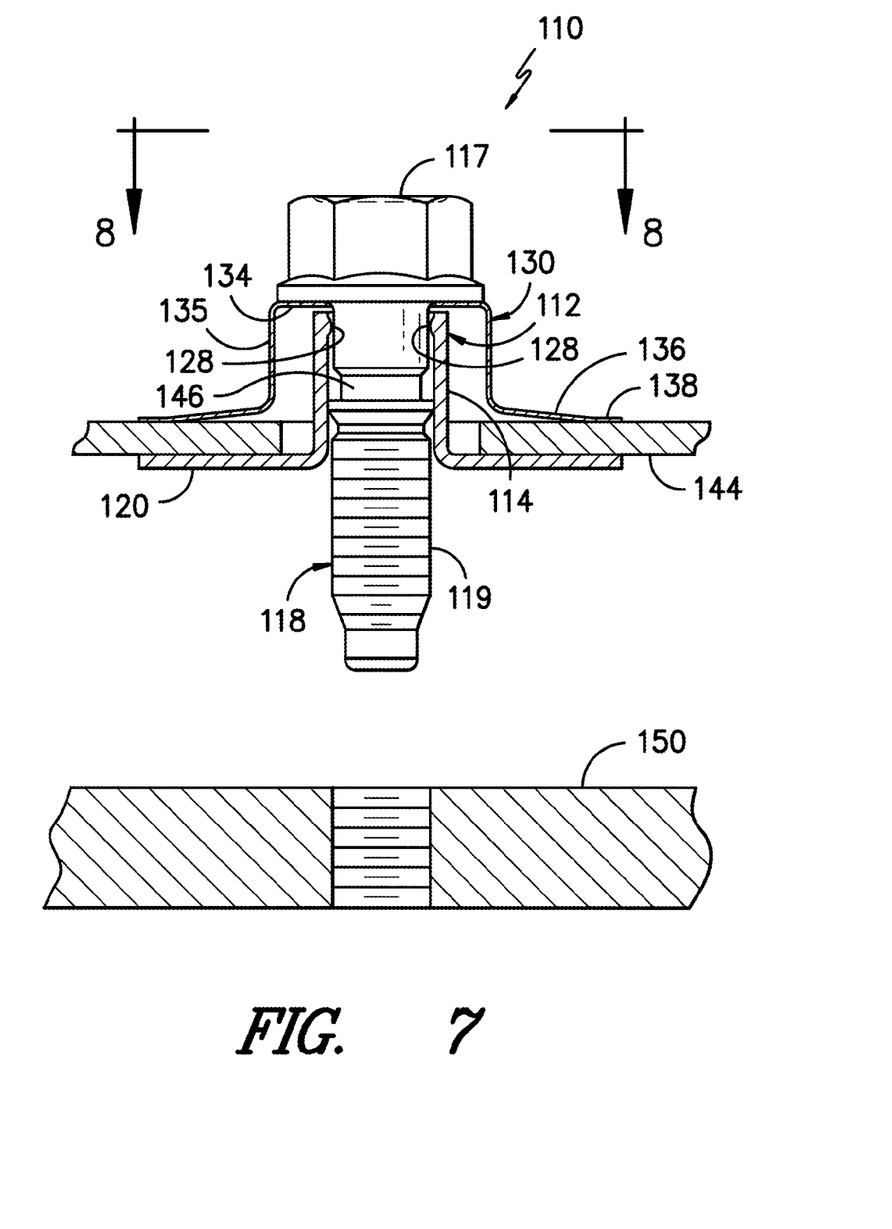
FIG. 7 is a schematic sectional view of an exemplary fastening system in accordance with another embodiment of the present disclosure with the fastening system aligned to engage an underlying mating structure.
Figure 8:
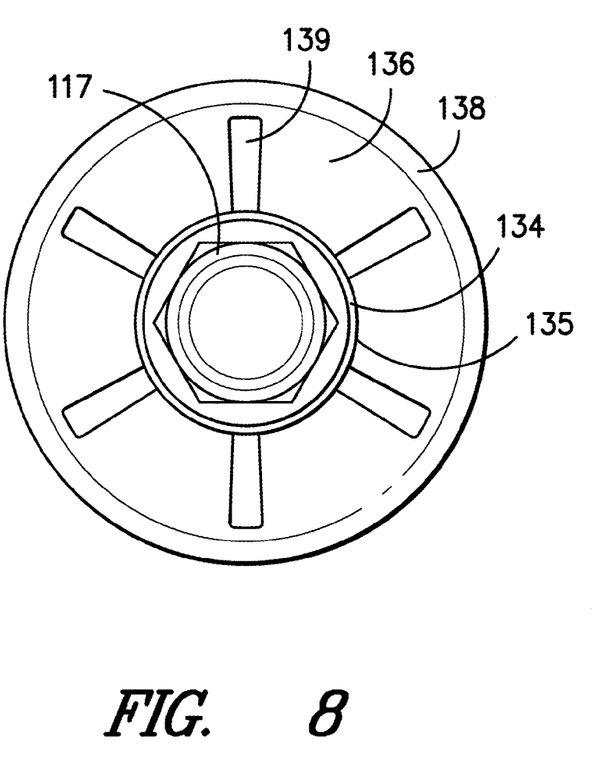
FIG. 8 is a schematic section view taken generally along line 8-8 in FIG. 7.

Referring now jointly to FIGS. 7 and 8, another exemplary fastening system 110 in accordance with the present disclosure is shown wherein elements corresponding to those described previously are designated by like reference numerals increased by 100. As shown, in this exemplary construction the fastening system 110 includes a compression limiting sleeve 112 (i.e. bushing) of drawn metal or the like. By way of example only, the sleeve 112 may be formed from spring steel or the like, although other metals or polymers may be used if desired.

As shown, in this embodiment, the sleeve 112 may have an axial hub 114 including a central axial passageway for receipt of a bolt 118. As shown, the bolt 118 may include a tool-engaging head 117 of polymeric geometry with a threaded shaft 119 extending downwardly from the head. In this regard, it is to be understood that the term "bolt" is meant to include any elongated male fastening element as may be known to those of skill in the art.

In the exemplary construction, the sleeve 112 may include a substantially flat annular sleeve flange 120 extending radially away from the distal end of the axial hub 114. In this construction, the upper surface of the annular sleeve flange 120 may be substantially planar to rest in substantially flat relation against a substantially planar underside surface of a fastened component 144. As shown, the annular sleeve flange 120 may intersect the axial hub 114 at approximately right angles. However, greater or lesser angles may be used if desired.

As shown, the axial hub 114 may be a substantially straight cylinder which is hollow along its length. A detent structure 128 in the form of a continuous or discontinuous ring, a series of individual raised profile elements or other structures may be disposed circumferentially about the interior of the hub at a fixed height along the length of the cylinder to define a minimum effective inner diameter for the hub 114. In practice, the detent structure 128 may be used to hold the sleeve 112 about the shaft 119 of the bolt 118 prior to use. In this regard, as the bolt 118 is pressed into the axial hub 114, the detent structure 128 may advance along the length of the shaft 119 until reaching a reduced diameter neck 146 above the threads. In this position the sleeve 112 is supported loosely about the bolt 18. In the absence of applied axial force, the detent structure 128 may be held between shoulders above and below the neck 146 and the sleeve 112 remains in a substantially fixed axial position relative to the shaft 119 prior to use.

As best seen through joint reference to FIGS. 7 and 8, the exemplary fastening system 110 further includes a spring element 130 of light weight stamped spring steel or the like. In the illustrated exemplary construction, the spring element 130 may be an annular disc spring with a generally top-hat shape construction adapted for disposition in surrounding relation to an upper segment of the shaft 119 in surrounding coaxial relation to the axial hub 114. In the illustrated exemplary construction, the spring element 130 includes a central opening adapted to circumferentially surround an upper segment of the shaft 119. In the exemplary construction a substantially flat annular spring base 134 surrounds the central opening 32 with a steep angled circumferential wall 135 disposed circumferentially about the annular spring base 134 and extending substantially vertically away from the annular spring base 134 to a sloped annular wall 136. The sloped annular wall 136 defines a biasing element extending downwardly and radially away from the steep angled circumferential wall 135. A substantially flat annular spring lip 138 may be disposed at the perimeter of the sloped annular wall 136. If desired, an arrangement of cut-out slits 139 may be disposed within the sloped annular wall 136 to reduce the spring resistance provided by the spring element 130 during use.

During a joining operation, the spring element 130 may be arranged about the shaft 119 such that the annular spring base 134 rests against the underside of the bolt head 117 and the spring lip 138 will rest on top of the fastened component 144 at an elevation below an upper edge of the axial hub 114. In the absence of adequate applied pressure from tightening the bolt, the spring action of the annular wall 136 will act to maintain a slight gap between underside of the annular spring base 134 and the upper proximal edge of the axial hub 114 extending above the surface of the fastened component 144. However, as pressure is applied downwardly by the bolt head 117 during tightening, the annular spring base 134 may be compressed towards the upper edge of the axial hub 114. This arrangement causes a relatively light pressure to be applied against the upper surface of the fastened component 144 as the bolt 118 is tightened. In this regard, the pressure is applied through the annular wall 136 to the annular spring lip 138 which rests on the upper surface of the fastened component 144. However, any possible over compression is prevented by the blocking action provided by the axial hub 114 extending above the surface of the fastened component 144.

As illustrated, the bolt 118 may be inserted for tightening into an acceptance opening in a mating structure 150 such as a rotatable nut, or a support component such as a backing panel or the like with a female opening adapted for engagement with the bolt 118. By way of example only, and not limitation, according to one exemplary practice the fastened component 144 may be a heat shield and the mating structure 150 may be a heat generating automotive engine component such as a manifold, an engine block or the like. As the bolt 118 is tightened down, the gap between the annular spring base 134 and the upper edge of the axial hub 114 is progressively closed until further advancement is blocked by the axial hub 114.

In the final clamped condition, the sleeve 112 supports the bolt load, while the spring element 130 applies a relatively small load across the upper surface of the fastened component 144 due to compression from the bolt head. The fastened component 144 is thereby secured in place by a clamping force between the annular sleeve flange 120 and the spring element 130. However, the clamping load applied by the bolt is carried by the axial hub 114. Of course, the amount of load carried by the fastened component 144 may be adjusted by adjusting the strength of the spring element 130 and the contact area between the fastened component 144 and the spring element 130.

As will be appreciated, the embodiment illustrated in FIGS. 7 and 8 may be particularly useful in environments where it is desired to maintain very close face-to-face spacing between the fastened component 144 and the mating structure 150. In this regard, such spacing may be defined by the thickness of the substantially flat annular sleeve flange 120. Additional spacing may be provided between the fastened component 144 and the mating structure by modifying the geometry of the annular sleeve flange 120 to be angled and/or to incorporate raised surfaces if desired.

Of course, variations and modifications of the foregoing are within the scope of the present disclosure. All dimensions are merely exemplary. Thus, it is to be understood that the disclosure disclosed and defined herein extends to all alternative combinations of two or more of the individual features mentioned or evident from the text and/or drawings. All of these different combinations constitute various alternative aspects of the present disclosure.

What is claimed is:

1. A fastening system adapted to secure a fastened component in overlying relation to an underlying mating structure, the fastening system comprising: an elongated fastener having a head and a shaft extending away from the head; an annular sleeve, the annular sleeve including an axial hub and an annular flange extending radially outwardly from the axial hub to a flange lip, the flange lip being disposed at an elevation below an upper proximal edge of the axial hub, the axial hub including a hollow central passageway, the central passageway being adapted to matedly receive the shaft of the fastener in pass-through relation such that a portion of the fastener remote from the head extends beyond the central passageway, and an annular spring adapted to matedly surround a portion of the shaft below the head and above the annular sleeve, the spring including a central opening with a plurality of flexible clamping fingers extending downwardly from positions disposed circumferentially about the central opening and wherein the fingers are arranged in a circumferential pattern to project downwardly and into the central passageway when the fastening system is in an assembled condition with a biasing element extending downwardly and radially outwardly away from the central opening to an outer edge of the spring disposed at an elevation below the central opening and below the upper proximal edge of the axial hub when the fastening system is in an assembled condition.

2. The fastening system as recited in claim 1, wherein the shaft includes a distal threaded portion and a reduced diameter neck disposed at a position between the head and the threaded portion.

3. The fastening system as recited in claim 1, wherein the annular sleeve is of unitary metal construction.

4. The fastening system as recited in claim 1, wherein the annular flange includes a substantially flat annular sleeve base surrounding the axial hub with a sloped wall of annular construction extending upwardly and radially outwardly away from the annular sleeve base to the flange lip.

5. The fastening system as recited in claim 1, wherein the flange lip defines an outer edge of the annular flange.

6. The fastening system as recited in claim 1, wherein the central passageway has a variable internal diameter along its length with an enhanced internal diameter in an upper proximal section and a reduced internal diameter in a lower distal section.

7. The fastening system as recited in claim 1, wherein the central passageway further includes a ring detent at a defined elevation within the central passageway.

8. The fastening system as recited in claim 7, wherein the ring detent defines the minimum internal diameter of the central passageway.

9. The fastening system as recited in claim 8, wherein the shaft includes a distal threaded portion and a reduced diameter neck disposed at a position between the head and the threaded portion and wherein the ring detent is adapted to engage the reduced diameter neck of the fastener when the fastener is inserted into the central passageway.

10. The fastening system as recited in claim 1, wherein the spring is a disc spring of unitary metal construction.

11. The fastening system as recited in claim 10, wherein the disc spring includes a substantially flat annular spring base surrounding a central opening with a sloped spring wall of annular construction extending downwardly and radially outwardly away from the spring base to a substantially flat spring lip defining an outer edge of the disc spring.

12. The fastening system as recited in claim 1, wherein the fingers are arranged in a circumferential pattern having a diameter corresponding substantially to the outer diameter of the shaft at an elevation below the head and less than the inner diameter of an upper proximal section of the central passageway surrounded by the upper proximal edge of the axial hub.

13. The fastening system as recited in claim 12, wherein one or more of the fingers include a radially inwardly projecting knuckle adapted to engage a portion of the shaft at an elevation below the head.

\* \* \* \* \*